United States Patent [19]

Lu et al.

[11] Patent Number: 4,743,384

[45] Date of Patent: May 10, 1988

[54] CARBOXYMETHYL GUAR BASED DRILLING FLUIDS

[75] Inventors: Cheng-Fa Lu; Carl A. Lukach, both of New Castle County, Del.; Robert R. Pas, Earls Court, United Kingdom

[73] Assignee: Aqualon Company, Wilmington, Del.

[21] Appl. No.: 862,746

[22] Filed: May 13, 1986

[51] Int. Cl.$^4$ .............................................. C09K 7/02
[52] U.S. Cl. .................................. 252/8.514; 252/8.51
[58] Field of Search ................. 252/8.51, 8.511, 8.514; 536/114

[56] References Cited

U.S. PATENT DOCUMENTS

| | | | |
|---|---|---|---|
| 2,520,161 | 8/1950 | Moe | 536/52 |
| 2,854,407 | 9/1958 | Mallory | 252/8.51 |
| 3,177,142 | 4/1965 | Brukner et al. | 252/8.511 |
| 3,830,736 | 8/1974 | Werdouschegg | 536/114 X |
| 3,960,736 | 6/1976 | Free et al. | |
| 4,105,461 | 8/1978 | Racciato | 106/205 |
| 4,151,096 | 4/1979 | Jackson | 252/8.511 |
| 4,250,044 | 2/1981 | Hinkel | |
| 4,374,216 | 2/1983 | Dammann | 524/35 |
| 4,378,049 | 3/1983 | Hsu et al. | 166/295 |
| 4,439,328 | 3/1984 | Moity | |
| 4,455,241 | 6/1984 | Swanson | 252/8.511 X |
| 4,469,620 | 9/1984 | Kohn | 252/315.3 |

FOREIGN PATENT DOCUMENTS 579582 7/1959 Canada .

Primary Examiner—Herbert B. Guynn
Attorney, Agent, or Firm—Joanne L. Horn; Mark D. Kuller

[57] ABSTRACT

Disclosed are (1) drilling fluid compositions consisting essentially of an aqueous medium selected from the group consisting of fresh and tap water, natural and synthetic sea water, and natural and synthetic brine, and carboxymethyl guar having a degree of substitution (D.S.) of 0.1 to 0.4; (2) drilling fluid compositions consisting essentially of an aqueous medium selected from the group consisting of fresh and tap water, natural and synthetic sea water, and natural and synthetic brine, a carboxymethyl guar having a D.S. of from 0.1 to 0.4, and a metal salt selected from the group consisting of water-soluble metal carbonates and bicarbonates; and (3) drilling fluid compositions consisting essentially of an aqueous medium selected from the group consisting of fresh and tap water, a carboxymethyl guar having a D.S. of from 0.1 to 0.4, a metal salt selected from the group consisting of water-soluble metal carbonates and bicarbonates, and a noncarbonate polyvalent metal salt.

20 Claims, No Drawings

CARBOXYMETHYL GUAR BASED DRILLING FLUIDS

This invention relates to aqueous drilling fluids for use in wellbores traversing subterranean formations and the method of preparing same.

Drilling fluids, or drilling muds as they are typically referred to in the industry, are used in drilling oil, gas or water wells to transport drill cuttings to the surface of the well, to control formation pressures, to maintain stability in the uncased sections of the borehole, protect productive formations, and cool and lubricate the drill bit and drill string. Hence, a drilling fluid must have certain characteristics, namely, low fluid loss or filtration control, solid suspension power, shale inhibition, shear insensitivity, thermal stability, pseudoplasticity and tolerance to polyvalent cations.

Although it has been suggested in the past in use guar and its derivatives as additives for drilling fluids, they have not been used to any significant extent since such drilling fluids tend to flocculate the clay and drill solids, are not biostable, and are thermally stable only at low temperatures, i.e., 150° F. or lower. Thus the application of drilling fluids containing guar or guar derivatives has been limited to shallow wells, primarily in drilling fluids for non-circulating systems where the spent mud is dumped immediately into a mud pit after its emergence at the surface of the well.

Moreover, the prior art has not taught or suggested the use of a carboxymethyl guar, let alone a carboxymethyl guar having a critical degree of substitution (D.S.), in combination with an aqueous medium as a drilling fluid for high temperature applications, i.e., greater than 150° F.

Hence, it was quite unexpected when a composition consisting essentially of carboxymethyl guar (CM guar) having a 0.1 to 0.4 D.S. and an aqueous medium selected from the group consisting of fresh and tap water, natural and synthetic sea water, and natural and synthetic brine provided a drilling fluid which is tolerant to calcium and high ionic strength environments at elevated temperatures up to 200° F., has good rheological and fluid loss properties, exhibits excellent clay and shale inhibition, and shows no indication of flocculation or gelation of the clay or active drill solids. Preferably the carboxymethyl D.S. is from 0.25 to 0.4, most preferably from 0.25 to 0.36. Typically, the carboxymethyl guar is present in an amount from about 0.5 pounds per barrel of drilling fluid (ppb) to about 3.0 ppb, preferably from about 1.0 ppb to about 2.5 ppb. Typically, the carboxymethyl guar has an Ubbelohde reduced specific viscosity (RSV), i.e., specific viscosity divided by the polymer concentration (0.05 g/dl) in 2 wt.% KCl of greater than 10, preferably greater than 18, most preferably greater than 20 to about 26.

In another embodiment of this invention, the drilling fluid of this invention gave enhanced thermal stability up to at least 275° F. upon the addition of a water-soluble metal carbonate or bicarbonate, such as potassium or sodium carbonate or bicarbonate, alone in an aqueous medium selected from the group consisting of fresh and tap water, natural and synthetic sea water, and natural and synthetic brine, or in combination with a noncarbonate polyvalent metal salt in fresh water. Noncarbonate polyvalent metal salt as used in this application means a polyvalent metal salt which is not a polyvalent metal carbonate or bicarbonate. Suitable polyvalent metals include magnesium, calcium, aluminum or iron and suitable polyvalent metal salts include chloride and bromide.

Typically the water-soluble metal carbonate or bicarbonate is present in an amount from about 1 ppb to about 20 ppb, preferably from 1 ppb to about 10 ppb, most preferably from about 3 ppb to about 10 ppb. The noncarbonate polyvalent metal salt is typically present in an amount from about 1 ppb to about 5 ppb, preferably from 1 ppb to about 4 ppb.

The D.S. of the carboxymethyl guar is critical to the preparation of the drilling fluids of this invention. D.S. is the average number of carboxymethyl groups per anhydro sugar unit in the guar gum. For example, when the D.S. of the carboxymethyl guar is greater than 0.4, the shale inhibition properties are adversely affected and the polyvalent ionic environment tolerance, such as calcium tolerance, is diminished. When the D.S. of the carboxymethyl guar is less than 0.1, the yield point, apparent viscosity, shale inhibition and fluid loss properties are adversely affected.

The carboxymethyl guar is prepared from guar gum which is derived from the seed of the guar plant, *Cyamopsis tetragonolobus*, family Leguminosae. Guar gum is commercially available.

The carboxymethyl guar is prepared by any known method for preparing sodium carboxymethyl cellulose except that guar flour is used instead of cellulose. Typically the CM guar is prepared by adding a 50% aqueous caustic solution containing 1.2 moles of caustic, such as an aqueous solution of sodium hydroxide, to guar flour in the presence of a diluent, such as isopropyl alcohol t-butyl alcohol and acetone, and stirring until the ingredients ae thoroughly mixed and then adding 0.5 moles of monochloroacetic acid per mole of anhydro sugar unit in the guar molecule to the reaction mixture, heating to 60°–80° C., preferably about 70° C., and maintaining that temperature for about 1 to 5 hours, preferably about 2 hours, recovering the product, purifying by any conventional means if required, and drying.

The range of desirable properties of a drilling fluid are as follows:

Apparent Viscosity (AV) = 10–30 cps
Plastic Viscosity (PV) = 5–20 cps
Yield Point (YP) = 10–30 lbs/100 ft$^2$
10 sec Gel Strength = 5–20 lbs/100 ft$^2$
10 min Gel Strength = 10–30 lbs/100 ft$^2$
Fluid Loss = less than 15 ml/30 min.

The following examples illustrate aspects of this invention. They are not intended to limit the invention. Modifications of the specific drilling fluid composition and procedures of these examples can be made without departing from the spirit and scope of this invention.

All parts and percentages used in this specification are by weight unless otherwise indicated.

EXAMPLE 1

This example illustrates a preferred specific embodiment of the composition of this invention, and how to prepare it.

The drilling fluid composition is prepared by charging a Hamilton Beach mixer with 2.35 ppb carboxymethyl guar having a D.S. of 0.36 and 350 ml of water containing 17.5 ppb anhydrous KCl and mixing for 1 minute. The fluid is then transferred to a Multimixer and mixed with 25 ppb Rev Dust TM calcium montmorillonite clay for about 30 minutes. The pH is adjusted to about 9.5 with a 15% NaOH solution.

The other examples and the control examples are prepared using the procedure of Example 1 with any additional ingredients other than the polymer and aqueous medium being added after the fluid is transferred to the Multimixer. The ingredients used and the amounts of each ingredient are set forth in the tables in this specification.

Rev Dust calcium montmorillonite is a low yielding, non-swelling clay which simulates drill solids.

Unless otherwise indicated, the rheology data set forth in this application was determined at room temperature (73° F.) using a Bingham Plastic Model and a Fann 35 concentric rotary viscometer and the procedures of API Test Method RB 13 B, §2. The compositions which were heated are cooled to room temperature before the Fann 35 viscometer data is taken.

The plastic viscosity (PV) is the Fann 35 or Fann 50 viscometer 600 rpm dial reading minus the 300 rpm dial reading. The yield point (YP) is the Fann 35 or Fann 50 viscometer 300 rpm dial reading minus PV. The apparent viscosity (AV) is the viscosity at 600 rpm. The Fann 35 rheology data for Examples 1 and 4 and control Examples 2, 3, 5 and 6 are set forth in Table 1.

Stability in the Presence of Polymeric Drilling Fluid" presented at the 60th Annual Technical Conference and Exhibition of The Society of Petroleum Engineers (Sept. 22-25, 1985) by C. F. Lu.

TABLE 2

Fluid Loss and Shale Inhibition Properties

| Example No. | Mud | Water | Temp. °F. | Fluid Loss ml/ 30 min | Shale Inhibition[a] (G') dyne/cm$^2$ |
|---|---|---|---|---|---|
| 1 | CM Guar | Fresh | Room | 10.6 | 2.5 × 10$^7$ |
|  |  |  | 250 | 18.8 |  |
| 2 | Control | Fresh | Room | 6 | 2.4 × 10$^7$ |
|  |  |  | 250 |  |  |
| 3 | Control | Fresh | Room | 13 | — |
|  |  |  | 250 | 31 |  |
| 4 | CM Guar | Sea[b] | Room | 10.8 | 2 × 10$^7$ |
|  |  |  | 250 | 13.8 |  |
| 5 | Control | Sea[b] | Room | 5.4 | 1.6 × 10$^7$ |
|  |  |  | 250 | 5.0 |  |
| 6 | Control | Sea[b] | Room | 14.7 | 1.4 × 10$^7$ |
|  |  |  | 250 | 184 |  |
| 7 | Control[c] | Sea[b] | Room | 8.5 | 1.4 × 10$^7$ |
|  |  |  | 250 | 8.2 |  |

[a]G' of a Gumbo shale pellet immersed in the testing mud was used to predict shale inhibition. The shale inhibition increases with G'. G' was measured at ω = 1 rad/sec and strain = 0.5%, room temp.

TABLE 1

| Example No. | Muds | Base Fluid Chloride Content ppb | CM Guar ppb | Guar ppb | KCl ppb | Rev Dust ppb | Xanthan ppb | CMC[b] ppb | Starch[c] ppb |
|---|---|---|---|---|---|---|---|---|---|
| 1 | CM Guar (0.36 D.S.) | 0[a] | 2.35 | — | 17.5 | 25 | — | — | — |
| 2 | Control | 0[a] | — | — | 17.5 | 25 | 1 | 1 | 4 |
| 3 | Control | 0[a] | — | 2.35 | 17.5 | 25 | — | — | — |
| 4 | CM Guar (0.36 D.S.) | d | 2.35 | — | 17.5 | 25 | — | — | — |
| 5 | Control | d | — | — | 17.5 | 25 | 1 | 1 | 4 |
| 6 | Control | d | — | 2.35 | 17.5 | 25 | — | — | — |

| Example No. | Fann 35 Rheology Room Temp. (73° F.) | | | | | Gel Strength 10 sec lb/100 ft$^2$ | Gel Strength 10 min lb/100 ft$^2$ |
|---|---|---|---|---|---|---|---|
|  | 3 RPM cps | 300 RPM cps | 600 RPM cps | PV cps | YP lb/100 ft$^2$ | | |
| 1 | 550 | 53 | 35 | 17 | 36 | 5 | 5.5 |
| 2 | 700 | 52 | 35 | 18 | 34 | 9 | 11 |
| 3 | 1300 | 64 | 40 | 16 | 48 | 14 | 15 |
| 4 | 700 | 59 | 38 | 17 | 42 | 7 | 5 |
| 5 | 600 | 50 | 35 | 20 | 30 | 8 | 9 |
| 6 | 1300 | 63 | 39 | 15 | 48 | 13 | 12 |

[a]Fresh water
[b]CMC having a D.S. of 0.98.
[c]Dextrid starch.
[d]Sea water containing 2878 ml distilled water, 2.44 g NaHCO$_3$, 4.18 g CaCl$_2$.2H$_2$O, 12.34 g Na$_2$SO$_4$, 31.64 g MgCL$_2$.6H$_2$O and 71.93 g NaCl.

The fluid loss and shale inhibition properties of Examples 1 and 4 and control Examples 2, 3, 5, 6 and 7 are set forth in Table 2 below. The fluid loss is determined using a N. L. Baroid low pressure filter press apparatus according to the procedures of API Test Method RB 13B, §3. The shale inhibition (G') is determined with a Rheometrics pressure rheometer (Rheometrics System 4) according to the procedures set forth in a paper entitled "A New Technique for the Evaluation of Shale

[b]Sea water, 350 ml from a mixture containing 2878 ml distilled water, 2.44 g NaHCO$_3$, 4.18 g CaCl$_2$.2H$_2$O, 12.34 g Na$_2$SO$_4$, 31.64 g MgCL$_2$.6H$_2$O and 71.93 g NaCl.
[c]CMC/xanthan mud containing 0.65 ppb xanthan and 1.7 ppb Drispac regular CMC, 17.5 ppb KCl and 25 ppb Rev Dust.

The Triaxial Tester data obtained at a flow rate=800 ft/min and a confining pressure=2500 psi for Examples 1 and 4 and control Examples 2, 3, 5 and 6 are set forth in Table 3.

TABLE 3

Shale Inhibition Properties of Muds

| Initial Gumbo Shale, gm | 100[a] | 100[a] | 100[a] | 100[b] | 100[b] | 100[b] |
|---|---|---|---|---|---|---|
| Example No. | 1 | 2 | 3 | 4 | 5 | 6 |
| Core Number | 1 | 2 | 3 | 4 | 5 | 6 |
| Core Weight Data: |  |  |  |  |  |  |
| Initial, g | 106.90 | 105.98 | 106.85 | 106.47 | 106.81 | 107.66 |
| After Test, g | 108.47 | 106.89 | 107.47 | 108.23 | 107.75 | 108.56 |
| After Drying, g | 97.47 | 96.67 | 98.52 | 97.34 | 98.32 | 97.83 |
| Time to Failure, min. | 596. | 944.7 | 55. | None (24 hrs) | 256. | 58.42 |

TABLE 3-continued

| | Shale Inhibition Properties of Muds | | | | | |
|---|---|---|---|---|---|---|
| Initial Moisture, (%) | 6.9 | 5.98 | 6.85 | 6.47 | 6.81 | 7.66 |
| % Erosion | 9 | 9 | 8 | 9 | 8 | 9 |
| (% Erosion/hr.) | (0.91) | (0.57) | (8.73) | (0.38) | (1.87) | (9.24) |
| % Sample Remaining | 91 | 91 | 92 | 91 | 92 | 91 |
| % Water Absorption | 1.5 | 0.9 | 0.6 | 1.7 | 0.9 | 0.8 |
| Initial Diameter, in | 2.007 | 2.007 | 2.008 | 2.007 | 2.006 | 2.007 |
| Final Diameter, in | 1.994 | 1.982 | 1.992 | 1.993 | 1.995 | 1.987 |
| Initial Length, in | 0.940 | 0.940 | 0.969 | 0.930 | 0.936 | 0.973 |
| Final Length, in | 0.932 | 0.933 | 0.961 | 0.928 | 0.926 | 0.963 |
| Type of Failure | Plugged* | Plugged* | Plugged* | — | Plugged* | Plugged* |
| Plastic Viscosity | 14 cps | 19 cps | 16 cps | 16 cps | 20 cps | 16 cps |
| Yield Point, lbs/100 sq ft$^2$ | 38 | 33 | 48 | 39 | 31 | 40 |

*Indicates where failure exceeded 150 psi.
$^a$Fresh water
$^b$Artificial sea water [42 g sea salt/l distilled water (ASTM D-1141-52)].

The stabilized drilling fluid compositions of this invention are useful where high temperature stability is desirable, such as in offshore drilling applications. The temperature stability of sea water drilling fluids of Example 4 and control Example 6, both sodium carbonate stabilized and unstabilized, after hot rolling for 16 hours are set forth in Table 4 below.

The temperature stability of fresh water drilling fluids of Example 1, both stabilized and unstabilized are set forth in Tables 5 and 6. Table 6 shows that the stability of the drilling fluid of this invention is further improved by the addition of a noncarbonate polyvalent metal salt.

TABLE 5

| MgCl$_2$/Na$_2$CO$_3$ Stabilized Fresh Water Mud of Example 1 | | | | | | | | | |
|---|---|---|---|---|---|---|---|---|---|
| MgCl$_2$.6H$_2$O$^a$ ppb | Na$_2$CO$_3$ ppb | Temp. °F. | 3 RPM cps | 300 RPM cps | 600 RPM cps | PV cps | YP lb/100 ft$^2$ | Gel Strength 10 sec lb/100 ft$^2$ | Fluid Loss ml per 30 min |
| 0 | 0 | Room | 550 | 53 | 35 | 17 | 36 | 5 | 10.6 |
| 0 | 0 | 250 | <50 | 10 | 10 | 10 | 0 | 0 | 18.8 |
| 0 | 7 | Room | 500 | 51 | 34 | 17 | 34 | 4.5 | — |
| 0 | 7 | 250 | 200 | 49 | 33 | 17 | 32 | 2 | 10.4 |
| 3.5 | 7 | 250 | 300 | 48 | 32 | 16 | 32 | 3 | 9.0 |
| 3.5 | 7 | Room | 500 | 51 | 33 | 15 | 36 | 4.5 | — |
| 0 | 10 | Room | 550 | 55 | 36 | 17 | 38 | 5.5 | 8.8 |
| 0 | 10 | 250 | 140 | 41 | 29 | 17 | 24 | 1.5 | 17.4 |
| 4.0 | 10 | Room | 500 | 54 | 35 | 16 | 38 | 5 | 8.8 |
| 4.0 | 10 | 250 | 280 | 47 | 32 | 17 | 30 | 2.8 | 9.1 |

$^a$4 ppb of MgCl$_2$.6H$_2$O is equivalent to 1.9 ppb MgCl$_2$.

TABLE 4

| | | | High Temperature Performance | | | | | | |
|---|---|---|---|---|---|---|---|---|---|
| Example No. | Na$_2$CO$_3$ ppb | Temp. °F. | 3 RPM cps | 300 RPM cps | 600 RPM cps | PV cps | YP lb/100 ft$^2$ | Gel Strength 10 sec lb/100 ft$^2$ | Fluid Loss ml per 30 min |
| 4 | 0 | Room | 700 | 59 | 38 | 17 | 42 | 7 | 10.8 |
| 4 | 0 | 250 | <50 | 8 | 8 | 8 | 0 | 0 | 13.8 |
| 4 | 5 | Room | 700 | 60 | 38 | 16 | 44 | 6.5 | 7.8 |
| 4 | 5 | 250 | 400 | 53 | 35 | 17 | 36 | 4 | 8.4 |
| 4 | 10 | Room | 650 | 61 | 40 | 19 | 42 | 7 | 8.4 |
| 4 | 10 | 250 | 450 | 57 | 38 | 19 | 38 | 4.5 | 9.4 |
| 6 | 0 | Room | 1300 | 63 | 39 | 15 | 48 | 13 | 14.7 |
| 6 | 0 | 250 | 50 | 11 | 10.5 | 10 | 1 | 0.5 | 184.0 |
| 6 | 10 | Room | 1200 | 67 | 42 | 17 | 50 | 11 | 9.0 |
| 6 | 10 | 250 | 500 | 57 | 37 | 17 | 40 | 4 | 21.2 |

$^a$The sea water contains about 3.8 ppb MgCl$_2$.6H$_2$O (equivalent to about 1.8 ppb MgCl$_2$).

TABLE 6

| FeCl$_3$/Na$_2$CO$_3$, CaCl$_2$/Na$_2$CO$_3$ and AlCl$_3$/Na$_2$CO$_3$ Stabilized Fresh Water Mud of Example 1 | | | | | | | | | | | |
|---|---|---|---|---|---|---|---|---|---|---|---|
| FeCl$_3$ ppb | CaCl$_2$ ppb | AlCl$_3$ ppb | Na$_2$CO$_3$ ppb | Temp. °F. | 3 RPM cps | 300 RPM cps | 600 RPM cps | PV cps | YP lb/100 ft$^2$ | Gel Strength 10 sec. lb/100 ft$^2$ | Fluid Loss ml/30 min |
| 1.5 | 0 | 0 | 10 | Room | 1200 | 58 | 36 | 14 | 44 | 11 | 12 |
| 1.5 | 0 | 0 | 10 | 250 | 850 | 86 | 56 | 26 | 60 | 6 | 9.7 |
| 0 | 0 | 1.5 | 10 | Room | 350 | 53 | 35 | 17 | 36 | 3 | 7.0 |
| 0 | 0 | 1.5 | 10 | 250 | 200 | 48 | 33 | 18 | 30 | 1.5 | 10.6 |
| 0 | 1.7 | 0 | 10 | Room | 600 | 57 | 36 | 15 | 42 | 5.5 | 7.4 |
| 0 | 1.7 | 0 | 10 | 250 | 400 | 61 | 41 | 21 | 40 | 4.0 | 8.9 |
| 0 | 0 | 0 | 10 | Room | 550 | 55 | 36 | 17 | 38 | 5.5 | 8.8 |

TABLE 6-continued

FeCl₃/Na₂CO₃, CaCl₂/Na₂CO₃ and AlCl₃/Na₂CO₃ Stabilized
Fresh Water Mud of Example 1

| FeCl$_3$ ppb | CaCl$_2$ ppb | AlCl$_3$ ppb | Na$_2$CO$_3$ ppb | Temp. °F. | 3 RPM cps | 300 RPM cps | 600 RPM cps | PV cps | YP lb/100 ft$^2$ | Gel Strength 10 sec. lb/100 ft$^2$ | Fluid Loss ml/30 min |
|---|---|---|---|---|---|---|---|---|---|---|---|
| 0 | 0 | 0 | 10 | 250 | 140 | 41 | 29 | 17 | 24 | 1.5 | 17.4 |

The calcium tolerance of the drilling fluid compositions of Example 1 and of control Examples 3 and 8 is set forth below in Table 7.

TABLE 7

Calcium-Tolerance Properties in 4% CaCl$_2$ Solution at Room Temperature (73° F.)

| Example No. | 3 RPM cps | 300 RPM cps | 600 RPM cps | PV cps | YP lb/100 ft$^2$ | Gel Strength 10 sec. lb/100 ft$^2$ | Fluid Loss ml/30 min |
|---|---|---|---|---|---|---|---|
| 8$^a$ | 50 | 3 | 3 | 3 | 0 | 0 | 29 |
| 3 | 1300 | 66 | 42 | 18 | 48 | 13 | 12 |
| 1 | 350 | 46 | 31 | 16 | 30 | 3 | 9.7 |

$^a$Control containing 2.35 ppb CMC having a D.S. of 0.98, 17.5 ppb KCl and 25 ppb Rev Dust.

The KCl insensitivity of the drilling fluid compositions of Examples 4 and 9–12 of this invention is set forth in Table 8.

TABLE 8

KCl Insensitivity in Sea Water

| Example No. | CM Guar$^a$ ppb | KCl ppb | Rev Dust ppb | 3 RPM cps | 300 RPM cps | 600 RPM cps | PV cps | YP lb/100 ft$^2$ | Gel Strength 10 sec. lb/100 ft$^2$ | Gel Strength 10 min. lb/100 ft$^2$ | Fluid Loss ml/30 min |
|---|---|---|---|---|---|---|---|---|---|---|---|
| 4 | 2.35 | 17.5 | 25 | 600 | 54 | 35 | 16 | 38 | 6 | 6.5 | 10 |
| 9 | 2.35 | 35 | 25 | 550 | 51 | 33 | 15 | 36 | 5 | 5 | 8.3 |
| 10 | 2.35 | 52.5 | 25 | 550 | 51 | 33 | 15 | 36 | 5 | 5 | 10 |
| 11 | 2.35 | 70 | 25 | 550 | 50 | 33 | 16 | 34 | 4.5 | 5 | 9.5 |
| 12 | 2.35 | 0 | 25 | 700 | 58 | 38 | 18 | 40 | 7 | 7 | 9.3 |

$^a$CM guar having about 0.36 D.S.

The gel strength is a parameter used to predict the ability of the drilling fluid to carry the drill cuttings. The property and other performance properties of the drilling fluid compositions of Examples 1 and 4 and of control Examples 13 and 14 are set forth in Table 9.

TABLE 9

Performance Properties of CM Guar and of CM Guar/Xanthan Muds

| Example No. | CM Guar ppb | Water | Xanthan ppb | KCl ppb | Rev Dust ppb | 3 RPM cps | 300 RPM cps | 600 RPM cps | PV cps | YP lb/100 ft$^2$ | Gel Strength 10 sec. lb/100 ft$^2$ | Gel Strength 10 min. lb/100 ft$^2$ | Fluid Loss ml/30 min | Shale Inhibition$^a$ (G') dyne/cm$^2$ |
|---|---|---|---|---|---|---|---|---|---|---|---|---|---|---|
| 4 | 2.35 | Sea$^b$ | 0 | 17.5 | 25 | 700 | 59 | 38 | 17 | 42 | 7 | 5 | 10.8 | 2 × 10$^7$ |
| 13 | 1.7 | Sea | 0.65 | 17.5 | 25 | 1000 | 52 | 33 | 14 | 38 | 10 | 13 | 10.6 | 1.5 × 10$^7$ |
| 1 | 2.35 | Fresh | 0 | 17.5 | 25 | 550 | 53 | 35 | 17 | 36 | 5 | 5.5 | 10.6 | 2.5 × 10$^7$ |
| 14 | 1.7 | Fresh | 0.65 | 17.5 | 25 | 1000 | 52 | 33 | 14 | 38 | 11 | 14 | 11.2 | 2.7 × 10$^7$ |

$^a$G' of the Gumbo pellet immersed in the testing mud was used to predict shale inhibition properties. G' was measured at 0.5% strain and = 1 rad/sec.
$^b$Sea water, 350 ml. from a mixture containing 2878 ml distilled water, 2.44 g NaHCO$_3$, 4.18 g CaCl$_2$ 2H$_2$O, 12.34 g Na$_2$SO$_4$, 31.64 g MgCL$_2$ 6H$_2$O and 71.93 g NaCl.

The effect of the concentration of the CM guar in the drilling fluid on the rheology of the CM guar-based drilling fluids of Examples 15–17 of this invention is set forth in Table 10 below.

TABLE 10

Effect of Concentration on Rheology

| Example No. | CM Guar$^a$ ppb | Anhydrous MgCl$_2$ ppb | Na$_2$CO$_3$ ppb | AV cps | PV cps | YP lb/100 ft$^2$ | Gel Strength 10 sec/10 min lb/100 ft$^2$ |
|---|---|---|---|---|---|---|---|
| 15 | 1.25 | 1.062 | 4.37 | 13.5 | 8.0 | 11.0 | 1/1 |
| 16 | 1.5 | 1.275 | 5.25 | 17.5 | 9.0 | 17.0 | 2/2 |
| 17 | 2.0 | 1.7 | 7.0 | 27.0 | 13.0 | 27.0 | 3/3 |

$^a$D.S. of 0.36 in 350 ml fresh water.

The tolerance of the CM guar drilling fluids of Examples 16 and 18 of this invention to high ionic environments is set forth in Table 11 below.

TABLE 11

| | Ionic Tolerance | | |
|---|---|---|---|
| | Example 16 | | Example 18$^d$ |
| Properties | F.W.$^b$ | 15% KCl$^c$ | S.W.$^e$ |
| AV, cps | 12.5 | 16.5 | 15.5 |
| PV, cps | 9.0 | 9.0 | 10.0 |
| YP, lb/100 ft$^2$ | 17.0 | 15.0 | 11.0 |
| Gel Strength, 10 sec/10 min | 2/2 | 2/2 | 2/2 |

TABLE 11-continued

| | Ionic Tolerance | | |
|---|---|---|---|
| | Example 16 | | Example 18[d] |
| Properties | F.W.[b] | 15% KCl[c] | S.W.[e] |
| lb/100 ft² | | | |
| Fluid loss,[a] ml/ 30 min | 32 | 29 | 18 |

[a]API Test Method RP 13 B, §3.
[b]Fresh water, 350 ml.
[c]350 ml. of 15% KCl solution.
[d]1.5 ppg carboxymethyl guar of D.S. 0.36 and 3.75 ppb Na₂CO₃.
[e]Sea water, 350 ml. from a mixture containing 2878 ml distilled water, 2.44 g NaHCO₃, 4.18 g CaCl₂.2H₂O, 12.34 g Na₂SO₄, 31.64 g MgCL₂.6H₂O and 71.93 g NaCl.

The high temperature performance after hot rolling (H.R.) for 16 hours of the drilling fluids of Examples 16 and 18 of this invention is set forth in Table 12 below.

TABLE 12

| | Example 16 | | | | Example 18 | |
|---|---|---|---|---|---|---|
| | Fresh Water, ml | | 15% KCl | | Fresh Water, ml | |
| Properties | 250° F. | 275° F. | 250° F. | 275° F. | 250° F. | 250° F. |
| AV, cps | 15.0 | 8.0 | 15.25 | 14.5 | 16.0 | 13.5 |
| PV, cps | 9.0 | 7.0 | 10.0 | 10.0 | 10.0 | 10.0 |
| YP, lb/100 ft² | 12.0 | 2.0 | 10.5 | 9.0 | 12 | 7.0 |
| Gel Strength 10 sec/10 min lb/100 ft² | 0/0 | 0/0 | 1/1 | 1/1 | 1.0/1.5 | 0.5/0.5 |
| Fluid loss, ml/30 min | 30.6 | 158 | 21.8 | 51.1 | 28.0 | 27.0 |

The Fann 50C viscometer data is determined by heating each composition slowly from room temperature (73° F.). At various temperatures, the 600 and 300 rpm readings are taken from which the apparent viscosity, plastic viscosity and yield point are calculated using the Bingham Plastic Model. Each composition is then cooled back down to room temperature measuring the 600 and 300 rpm at the same temperatures where these readings were taken during the heat-up. From this data one can measure the recovery of each composition upon cooling. The Fann 50C data for the drilling fluids of Examples 16 and 18 of this invention are set forth in Table 13 below.

TABLE 13

| | Fann 50C Rheology | | | |
|---|---|---|---|---|
| Example No. | Temp °F. | AV cps | PV cps | YP lb/100 ft² |
| 16 (Fresh Water, 350 ml) | 85 | 16.0 | 10.4 | 11.1 |
| | 150 | 11.6 | 7.0 | 9.1 |
| | 250 | 7.2 | 4.8 | 4.8 |
| | 300 | 5.4 | 3.7 | 3.4 |
| | 250 | 6.2 | 4.3 | 3.7 |
| | 150 | 10.1 | 7.5 | 5.2 |
| | 85 | 14.9 | 9.5 | 10.8 |
| 16 (15% KCl, 350 ml) | 85 | 15.8 | 10.4 | 10.7 |
| | 150 | 11.7 | 7.4 | 8.5 |
| | 250 | 7.2 | 5.2 | 4.0 |
| | 300 | 5.7 | 3.7 | 4.0 |
| | 250 | 6.3 | 4.7 | 3.1 |
| | 150 | 10.2 | 7.4 | 5.6 |
| | 85 | 13.9 | 9.0 | 9.8 |
| 18 (Sea Water[a], 350 ml) | 85 | 14.7 | 10.4 | 8.6 |
| | 150 | 10.8 | 6.9 | 7.8 |
| | 250 | 6.7 | 4.5 | 4.3 |
| | 300 | 5.3 | 3.9 | 2.8 |
| | 250 | 6.6 | 5.3 | 2.5 |
| | 150 | 10.8 | 7.0 | 7.5 |
| | 85 | 15.7 | 10.1 | 11.1 |

[a]Sea water, 350 ml. from a mixture containing 2878 ml distilled water, 2.44 g NaHCO₃, 4.18 g CaCl₂.2H₂O, 12.34 g Na₂SO₄, 31.64 g MgCL₂.6H₂O and 71.93 g NaCl.

The data in Table 13 show good regain of properties upon cooling after heating to 300° F.

The tolerance of the drilling fluids of Examples 16 and 18 of this invention to Bonney Field Gumbo (BFG) shale is set forth in Table 14 below.

TABLE 14

| | Titration with Bonney Field Gumbo (BFG) | | | | | | | | | |
|---|---|---|---|---|---|---|---|---|---|---|
| | Example 16 | | | | | Example 18 | | | | |
| Properties | 0 ppb[a] BFG | 20 ppb BFG | 40 ppb BFG | 60 ppb BFG | 80 ppb BFG | 0 ppb[a] BFG | 20 ppb BFG | 40 ppb BFG | 60 ppb BFG | 80 ppb BFG |
| AV, cps | 17.5 | 17.5 | 22.0 | 26.25 | 32.0 | 14.0 | 18.0 | 20.0 | 24.5 | 29.5 |
| PV, cps | 10.0 | 11.5 | 13.0 | 17.0 | 20.0 | 9.0 | 12.0 | 12.0 | 15.0 | 19.0 |
| YP, lb/100 ft² | 15.0 | 16.0 | 18.0 | 18.5 | 24.0 | 10.0 | 12.0 | 16.0 | 19.0 | 21.0 |
| Gel Strength 10 sec/10 min lb/100 ft² | 2.5/2.0 | 2/2 | 3/2.5 | 3/3.5 | 4.5/8 | 1/1 | 2/2 | 2/2.5 | 3/4 | 4/9 |

[a]Sheared 1 minute in Hamilton Beach mixer and then 30 minutes in Multimixer. Sheared 5 minutes in Multimixer with each addition of BFG.

The data in Table 14 show that the drilling fluids of this invention have good tolerance to BFG shale up to 80 ppb.

The clay inhibition of the drilling fluids of Example 18 of this invention and control Example 19 at room temperature and after hot rolling at 250° F. for 16 hours is set forth in Table 15 below.

TABLE 15

| | Addition of 10.5 ppb Bentonite | | | |
|---|---|---|---|---|
| | Control Example 19[a] | | Example 18[b] | |
| | R.T.[c] | Hot Rolled @ 250° F. for 16 hrs. | R.T.[c] | Hot Rolled @ 250° F. for 16 hrs. |
| AV, cps | 20.0 | 30.0 | 17.5 | 21.0 |
| PV, cps | 4.0 | 4.0 | 11.0 | 16.0 |
| YP, lb/100 ft² | 31.0 | 52.0 | 13.0 | 10.0 |
| Gel Strength 10 sec/10 min lb/100 ft² | 20/24 | 46/38 | 2/3.5 | 0/0 |
| Fluid loss, ml/30 min | — | 40.0 ml | — | 11.0 |

[a]Anhydrous MgCl₂ 1.275 ppb; Na₂CO₃ 5.25 ppb; bentonite 10.5 ppb; and fresh water, 350 ml.
[b]Sea water, 350 ml of a mixture containing 2878 ml distilled water, 2.44 g NaHCO₃, 4.18 g CaCl₂.2H₂O, 12.34 g Na₂SO₄, 31.64 g MgCL₂.6H₂O and 71.93 g NaCl.
[c]R.T. = room temperature (73° F.).

Thus this invention provides drilling fluid compositions which are tolerant to calcium and high ionic strength environments at elevated temperatures from 200° F. up to 275° F., have good rheological and fluid loss properties, and exhibit excellent clay and shale inhibition, but do not flocculate or gel the clay or the active drill solids.

Other features, advantages and specific embodiments of this invention will become apparent to those exercising ordinary skill in the art after reading the foregoing disclosures. Such specific embodiments are within the scope of this invention. Moreover, while specific embodiments of the invention have been described in considerable detail, it is not limited thereto, and variations and modifications of those embodiments can be effected without departing from the spirit and scope of the invention.

What is claimed is:

1. A drilling fluid composition consisting essentially of (a) an aqueous medium selected from the group consisting of fresh and tap water, natural and synthetic sea water, and natural and synthetic brine; and (b) a carboxymethyl guar having a D.S. of from 0.1 to 0.4, said drilling fluid having an apparent viscosity of 10–30 cps, plastic viscosity of 5–20 cps, yield point of 10–60 lbs/100 ft$^2$, 10 sec Gel Strength of 5–20 lbs/100 ft$^2$, 10 min Gel Strength of 10–30 lbs/100 ft$^2$, and fluid loss of less than 15 ml/30 min.

2. The composition of claim 1 wherein the carboxymethyl guar has a D.S. of from 0.25 to 0.4.

3. The composition of claim 1 wherein the carboxymethyl guar has a D.S. of from 0.25 to 0.36.

4. The composition of claim 1 wherein the carboxymethyl guar is present in an amount from about 0.5 ppb to 3.0 ppb.

5. The composition of claim 1 wherein the carboxymethyl guar has a Ubbelohde reduced specific viscosity in 2 wt. % KCl of greater than 10.

6. The composition of claim 1 wherein the carboxymethyl guar has a Ubbelohde reduced specific viscosity in 2 wt. % KCl of greater than 20 to about 26.

7. The drilling fluid of claim 1, further comprising suspended drill solids.

8. The drilling fluid of claim 1, said drilling fluid having a yield point of 10–30 lbs/100 ft$^2$.

9. A drilling fluid composition consisting essentially of (a) an aqueous medium selected from the group consisting of fresh and tap water, natural and synthetic sea water, and natural and synthetic brine; (b) a carboxymethyl guar having a D.S. of from 0.1 to 0.4; and (c) suspended drill solids.

10. A drilling fluid composition consisting essentially of (a) an aqueous medium selected from the group consisting of fresh and tap water, natural and synthetic sea water, and natural and synthetic brine; (b) a carboxymethyl guar having a D.S. of from 0.1 to 0.4; and (c) from about 1 ppb to about 20 ppb of a metal salt selected from the group consisting of water-soluble metal carbonates and bicarbonates, said drilling fluid having an apparent viscosity of 10–30 cps, plastic viscosity of 5–20 cps, yield point of 10–60 lbs/100 ft$^2$, 10 sec Gel Strength of 5–20 lbs/100 ft$^2$, 10 min Gel Strength of 10–30 lbs/100 ft$^2$, and fluid loss of less than 15 ml/30 min.

11. The composition of claim 10 wherein the carboxymethyl guar has a D.S. of from 0.25 to 0.4.

12. The composition of claim 10 wherein the carboxymethyl guar has a D.S. of from 0.25 to 0.36.

13. The composition of claim 10 wherein the carboxymethyl guar is present in an amount from about 0.5 ppb to 3.0 ppb.

14. The composition of claim 10 wherein the metal salt is selected from the group consisting of potassium carbonate, sodium carbonate, potassium bicarbonate and sodium bicarbonate.

15. A drilling fluid composition consisting essentially of (a) an aqueous medium selected from the group consisting of fresh and tap water; (b) a carboxymethyl guar having a D.S. of from 0.1 to 0.4; (c) from about 1 ppb to about 20 ppb of a metal salt selected from the group consisting of water-soluble metal carbonates and bicarbonates; and (d) from about 1 ppb to about 5 ppb of a noncarbonate polyvalent metal salt, said drilling fluid having an apparent viscosity of 10–30 cps, plastic viscosity of 5–20 cps, yield point of 10–60 lbs/100 ft$^2$, 10 sec Gel Strength of 5–20 lbs/100 ft$^2$, 10 min Gel Strength of 10–30 lbs/100 ft$^2$, and fluid loss of less than 15 ml/30 min.

16. The composition of claim 15 wherein the carboxymethyl guar has a D.S. of from 0.25 to 0.4.

17. The composition of claim 15 wherein the carboxymethyl guar has a D.S. of from 0.25 to 0.36.

18. The composition of claim 15 wherein the carboxymethyl guar is present in an amount from about 0.5 ppb to 3.0 ppb.

19. The composition of claim 15 wherein the metal salt is selected from the group consisting of potassium carbonate, sodium carbonate, potassium bicarbonate and sodium bicarbonate.

20. The composition of claim 19 wherein the noncarbonate polyvalent metal salt is selected from the group consisting of chloride and bromide salts of magnesium, calcium, aluminum and iron.

* * * * *